US008868675B2

(12) United States Patent
Srinivasan (10) Patent No.: US 8,868,675 B2
(45) Date of Patent: Oct. 21, 2014

(54) NETWORK OPTIMIZATION USING DISTRIBUTED VIRTUAL RESOURCES

(75) Inventor: Udayakumar Srinivasan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 770 days.

(21) Appl. No.: 12/328,747

(22) Filed: Dec. 4, 2008

(65) Prior Publication Data

US 2010/0146074 A1    Jun. 10, 2010

(51) Int. Cl.
*G06F 15/167* (2006.01)
*G06F 15/16* (2006.01)
*G06F 9/50* (2006.01)
*H04L 29/08* (2006.01)

(52) U.S. Cl.
CPC .............. *G06F 9/5077* (2013.01); *H04L 67/10* (2013.01)
USPC ............................ 709/214; 709/201; 709/219

(58) Field of Classification Search
USPC ......... 709/217, 218, 219, 238, 239, 240, 241, 709/242, 243, 244, 201, 213, 214
See application file for complete search history.

(56) References Cited

U.S. PATENT DOCUMENTS

| | | | | |
|---|---|---|---|---|
| 6,199,107 B1* | 3/2001 | Dujari | ........................... | 709/219 |
| 6,760,756 B1* | 7/2004 | Davis et al. | .................... | 709/215 |
| 7,191,290 B1* | 3/2007 | Ackaouy et al. | .............. | 711/119 |
| 7,373,451 B2* | 5/2008 | Lam et al. | ......................... | 711/6 |
| 7,386,662 B1* | 6/2008 | Kekre et al. | .................... | 711/113 |
| 7,580,919 B1* | 8/2009 | Hannel et al. | .......................... | 1/1 |
| 7,636,801 B1* | 12/2009 | Kekre et al. | ..................... | 710/31 |
| 7,693,983 B1* | 4/2010 | Gupta et al. | .................... | 709/224 |
| 7,725,559 B2* | 5/2010 | Landis et al. | ................. | 709/215 |
| 7,784,049 B1* | 8/2010 | Gandler | ............................ | 718/1 |
| 2002/0133491 A1* | 9/2002 | Sim et al. | ........................ | 707/10 |
| 2003/0065743 A1* | 4/2003 | Jenny et al. | .................... | 709/219 |
| 2004/0210623 A1* | 10/2004 | Hydrie et al. | ................. | 709/201 |
| 2005/0044301 A1* | 2/2005 | Vasilevsky et al. | ............... | 711/1 |
| 2005/0108712 A1* | 5/2005 | Goyal | ........................... | 718/100 |
| 2005/0120160 A1* | 6/2005 | Plouffe et al. | ..................... | 711/1 |
| 2005/0125513 A1* | 6/2005 | Sin-Ling Lam et al. | ....... | 709/220 |
| 2006/0010295 A1* | 1/2006 | Franaszek et al. | ............ | 711/138 |
| 2006/0277180 A1* | 12/2006 | Okamoto | .......................... | 707/7 |
| 2007/0078988 A1* | 4/2007 | Miloushev et al. | ........... | 709/227 |
| 2007/0234302 A1* | 10/2007 | Suzuki et al. | ................. | 717/126 |

(Continued)

OTHER PUBLICATIONS

Muthitacharoen, Athicha et al., "A Low-bandwidth Network File System", In the Proceedings of the 18th Symposium on Operating Systems (SOSP) Banff, Canada Oct. 2001, 1-14.

(Continued)

*Primary Examiner* — Madhu Woolcock (57) ABSTRACT

In one example embodiment, an apparatus may include a first virtual machine provided on a first local device of a plurality of local devices, wherein a portion of resources of the first local device are allocated to the first virtual machine. A virtualization software switch may be provided on the first local device, configured to forward or redirect at least some traffic from the first local device to a WAN (Wide Area Network) optimization virtual appliance, the WAN optimization virtual appliance including at least the first virtual machine, a second virtual machine on a second local device of the plurality of local devices, and a distributed WAN optimization application running at least on the first and second virtual machines.

19 Claims, 5 Drawing Sheets

(56) References Cited

U.S. PATENT DOCUMENTS

| | | | | |
|---|---|---|---|---|
| 2007/0294676 | A1* | 12/2007 | Mellor et al. | 717/139 |
| 2008/0250222 | A1* | 10/2008 | Gokhale et al. | 711/203 |
| 2009/0073895 | A1* | 3/2009 | Morgan et al. | 370/255 |
| 2009/0089410 | A1* | 4/2009 | Vicente | 709/223 |
| 2009/0199177 | A1* | 8/2009 | Edwards et al. | 718/1 |
| 2009/0210869 | A1* | 8/2009 | Gebhart et al. | 717/174 |
| 2009/0249279 | A1* | 10/2009 | Bourdon | 717/101 |
| 2009/0260006 | A1* | 10/2009 | Hotra | 718/1 |
| 2009/0265707 | A1* | 10/2009 | Goodman et al. | 718/1 |
| 2009/0300149 | A1* | 12/2009 | Ferris et al. | 709/222 |
| 2010/0031255 | A1* | 2/2010 | Huber et al. | 718/1 |
| 2010/0049921 | A1* | 2/2010 | Aronovich et al. | 711/130 |
| 2010/0095000 | A1* | 4/2010 | Kettler et al. | 709/226 |
| 2013/0275964 | A1* | 10/2013 | Edwards et al. | 718/1 |

OTHER PUBLICATIONS

Spring, Neil T., et al., "A Protocol-Independent Technique for Eliminating Redundant Network Traffic", Proceedings of the 2000 ACM SIGCOMM Conference, pp. 87-95 Stockholm, Sweeden, Computer Science and Engineering, 352350, University of Washington, Seattle, Washington 98195-2350,(Aug. 2000),1-9.

"CISCO Wide Area Application Services (WAAS) V 4.0 Technical Overview", CISCO Systems Inc, (Nov. 2006),1-12.

"Distributed hash table", Wikipedia, the free encyclopedia at http://en.wikipedia.org/wiki/Distributed_hash_table, (Jan. 17, 2007),1-5.

Wei, David X., et al., "Fast TCP: Motivation, Architecture, Algorithms, Performance", IEEE/ACM Transactions on NEtworking 14(6): 1246-1259, Engineering and Applied Science, Caltech,(Dec. 2006),1-14.

Mears, Jennifer "Moving beyond server virtualization: On the desktop, virtualization helping with security, management", Network World from: http://www.networkworld.com/news/2006/010906-virtualization.html?page=1, (Jan. 9, 2006),1-3.

Talpey, Tom et al., "NFS RDMA Problem Statement", The Internet Society, (Feb. 2004),1-17.

Mears, Jennifer, "Moving Beyond Server Virtualization," Network World , Jan. 9, 2006, 3 pgs <http://www.networkworld.com/news/2006/010906-virtualization.html>.

Wei, David X. et al., "Fast TCP: Motivation, Architecture, Algorithms, Performance," IEEE/ACM Transactions on Networking, 14(6):1246-1259, Dec. 2006 <http://netlab.caltech.edu/pub/papers/FAST-ToN-final-060209.pdf>.

Cisco White Paper, "Cisco Wide Area Application Services (WAAS) V4.0 Technical Overview," 12 pgs from 2006 Web Archive <http://web.archive.org/web/20061202075848/www.cisco.com/application/pdf/en/us/guest/products/ps6870/c1244/cdccont_0900aecd8051d5b2.pdf>.

Muthitacharoen, Athicha et al., "A Low-bandwidth Network File System," Proceedings of the 18th Symposium on Operating Systems Principles (SOSP), Banff, Canada, Oct. 2001, 14 pgs. <http://www.pdos.lcs.rnit.edu/papers/lbfs:sosp01/lbfs.pdf>.

Spring, Neil T. et al., "A Protocol-Independent Technique for Eliminating Redundant Network Traffic," Proceedings of the 2000 ACM SIGCOMM Conference, pp. 87-95, Stockholm, Sweden, Aug. 2000 <http://www.cs.washington.edu/hornes/nspring/papers/sigcomm2000.pdf>.

Talpey, Tom et al., "NFS RDMA Problem Statement" (2004), 17 pgs. <http://web.archive.org/web/20070808183131/http://www3.ietf.org/proceedings/04 mar/I-D/draft-ietf-nfsv4-nfs-rdma-problem-statement-00.txt>.

Wikipedia entry, "Distributed hash table," updated as of Jan. 17, 2007, 5 pgs. <http://web.archive.org/web/20070214140446/http://en.wikipedia.org/wiki/Distributed_hash_table>.

* cited by examiner

NETWORK OPTIMIZATION USING DISTRIBUTED VIRTUAL RESOURCES

TECHNICAL FIELD

The present disclosure relates generally to network optimization and virtual appliances.

BACKGROUND

Networks such as business networks may include a home or headquarters node, and field office or branch office nodes. Such nodes may communicate via a wide area network (WAN) such as the Internet, for example. Large amounts of computing resources and transmission resources may be expended by redundant data transmission, for example, between a branch office and a headquarters office. WAN optimization products may involve using a physical branch office appliance, for example, to determine whether requested data items have already been requested and received at the branch office (and thus may be retrieved from a cache memory located at the branch office instead), in efforts to eliminate or minimize redundancy of WAN transmissions. Such a physical branch office appliance may involve associated costs of deployment and maintenance of the appliance. Further, boundaries of branch offices are increasingly becoming less clearly defined, as many businesses are moving toward shared office space and telecommuting environments.

Additionally, some techniques for WAN redundancy elimination are experiencing scaling problems in datacenters or headends, for example, in the home or headquarters offices, where a number of branch office connections may be aggregated. Redundancy elimination may be performed more efficiently in environments supporting more storage for caching redundant chunks of data on both sides of the WAN (i.e., at the headquarters office and at the branch office). For example, if an enterprise includes 1,000 branch offices, and each branch office includes one gigabyte (GB) of cache memory available for storage, then the headquarters office may need 1,000*1 GB=1 TeraByte of cache memory to be able to process the information associated with all the branch offices. Disk based cache memory may be implemented to achieve the needed size of memory; however, disk based cache may introduce various throughput limitations.

DESCRIPTION OF EXAMPLE EMBODIMENTS

Overview

According to one general aspect, an apparatus may include a first virtual machine provided on a first local device of a plurality of local devices, wherein a portion of resources of the first local device are allocated to the first virtual machine. A virtualization software switch may be provided on the first local device, configured to forward or redirect at least some traffic from the first local device to a WAN (Wide Area Network) optimization virtual appliance. The WAN optimization virtual appliance may include at least the first virtual machine, a second virtual machine on a second local device of the plurality of local devices, and a distributed WAN optimization application running at least on the first and second virtual machines.

According to another general aspect, a method of performing WAN optimization may include forwarding or redirecting data received from a remote device to a WAN optimization application by a virtualization software switch provided on a first local device of a plurality of local devices. Data received from the remote device may be stored in a distributed database that includes resources of one or more of the plurality of local devices, the resources being allocated for WAN optimization by virtualization software. A request to receive the data from the remote device may be received at the WAN optimization application from a second local device of the plurality of local devices, wherein the requested data is also stored or cached in the distributed database. The request may be fulfilled based on the data stored in the distributed database.

According to another general aspect, a method of performing WAN optimization may include storing at least a segment signature, for each of a plurality of data segments transmitted to a remote device, the segment signature being stored in a distributed database that includes resources of one or more of a plurality of local devices, at least a portion of the resources being allocated for WAN optimization by virtualization software. A request to transmit data to the remote device over a WAN may be received at a receiving one of the plurality of local devices. The request may be forwarded, by a virtualization software switch provided on the receiving local device, to a WAN optimization application provided on one of the plurality of local devices. It may be determined, by a lookup in the distributed database, that one of the requested data segments was previously transmitted. The stored segment signature for the requested data segment may be transmitted from the distributed database to the remote device.

According to yet another general aspect, a method may include forwarding or redirecting at least some received traffic from a virtualization software switch, running on a first virtual machine and provided on a first local device of a plurality of local devices, to a WAN optimization virtual appliance. The WAN optimization virtual appliance may include at least the first virtual machine, a second virtual machine on a second local device of the plurality of local devices, and a distributed WAN optimization application running at least on the first and second virtual machines.

Description

Figure 1:
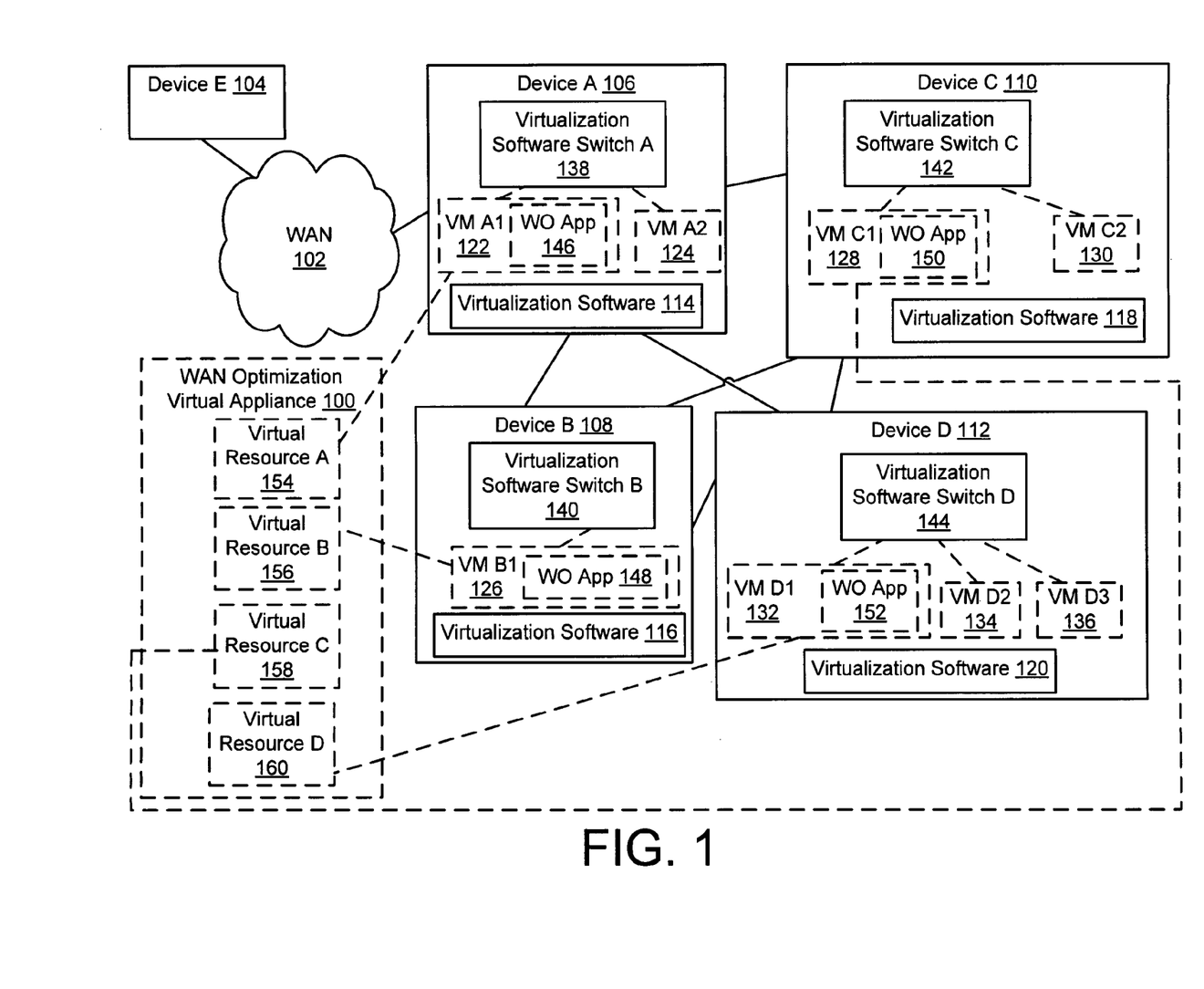
FIG. 1 is a block diagram illustrating a WAN (Wide Area Network) optimization virtual appliance according to an example embodiment.

FIG. 1 is a block diagram of a Wide Area Network (WAN) optimization virtual appliance 100 according to an example embodiment. The WAN optimization virtual appliance 100 may be coupled via a WAN network 102 to a remote device E 104. The WAN optimization virtual appliance 100 may include, for example, a plurality of local computing devices (or at least portions thereof) coupled together, including device A 106, device B 108, device C 110 and device D 112.

For example, the local computing devices 106, 108, 110, 112 may communicate with each other via a network connection such as a local area network (LAN) connection, a wide area network (WAN) connection, or a device-to-device or node-to-node connection such as a fast device-to-device connection (e.g., connection speeds in gigabytes per second or faster). For example, the devices 102, 104, 106, 108 may be coupled by a point-to-point connection, which may include optical fiber, copper wire, twisted pair, coaxial cable, or an air (or wireless) interface, according to example embodiments. These are some example connection types and other types of connections may be used.

Each local device 106, 108, 110, 112, etc. may include a number of resources, such as a processor or CPU, memory or cache, and disk, and possibly other resources. One skilled in the art of data processing will appreciate that this list is not exhaustive, and that any number of device resource types and/or device resources may reside on any particular device 106, 108, 110, 112. Virtualization software 114, 116, 118, 120 may be provided or may run on each local device, e.g., to allocate at least a portion of the resources on the device to the WAN optimization virtual appliance 100. The virtualization software 114, 116, 118, 120 may provide, for example, one or more virtual machines (VMs) running on each local device. For example, VM A1 122 and/or VM A2 124 may be running or provided on device A 106, VM B1 126 may be provided or running on device B 108, VM C1 128 and/or C2 130 may be provided or running on device C 110, and VMs D1 132, D2 134, and/or D3 136 may be provided or running on device D 112.

In this context, virtualization software may include a layer of software installed directly on the hardware of a device or on a host operating system. This software layer may create virtual machines and may include a virtual machine monitor or "hypervisor" that may allocate hardware resources dynamically and transparently so that multiple operating systems may run concurrently on a single physical device without users being aware of the presence of the multiple operating systems.

In this context, a virtual machine may refer to a type of computer application used to create a virtual environment, which may be referred to as virtualization. For example, virtualization may be used to run multiple operating systems at the same time on a single device. Through the help of a virtual machine, a user may operate software located on the computer platform associated with a particular virtual machine.

Such virtual machines may be handled by hardware virtual machine software, such as a hypervisor or virtual machine monitor. This type of virtualization software may make it possible to perform multiple identical executions on one computer. In turn, each of these executions may run an operating system, thus allowing multiple applications to be run on different operating systems, even on devices supporting operating systems for which the applications were not originally intended. For example, each virtual machine (VM) may run on a virtual imitation of the hardware layer without change to a guest operating system. Further, virtual machines may run different operating systems and have no knowledge of the hypervisor or each other. In this context, a hypervisor or virtual machine monitor may coordinate and validate instructions to a CPU of the host device. In this example, the virtualization software such as a hypervisor or virtual machine monitor may provide resource allocation (e.g., CPU, memory, disk, network I/O) per virtual machine.

For example, by using hardware virtual machine software, a user may obtain a seemingly private machine with fully functional hardware that is separate from other users. Hardware virtual machine software may also enable users to boot and restart their machines quickly, since tasks such as hardware initialization may not be necessary. For example, by using application virtual machine software, an application may be isolated from the computer or device being used. This software may be used on a number of computer platforms, and may thus make it unnecessary to create separate versions of the same software for different operating systems and computers. For example, a Java Virtual Machine is an example of an application virtual machine.

As another example, a virtual machine may include a virtual environment, or a virtual private server. A virtual environment may be used for running programs at the user level, and may be used solely for applications.

Each local computing device 106, 108, 110, 112 may include a virtualization software switch 138, 140, 142, 144, respectively, which may forward or direct or redirect traffic to and/or from the local computing device 106, 108, 110, 112 to a distributed WAN optimization application such as one or more WO Apps 146, 148, 150, or 152. The distributed WAN optimization application (e.g., WAN optimization applications 146, 148, 150, 152) may be running or be provided on one or more local devices such as the local computing devices 106, 108, 110, 112, and may perform WAN optimization. According to an example embodiment, the distributed WAN optimization application (e.g., WAN optimization applications 146, 148, 150, 152) may be running via one or more of the virtual machines 122, 124, 126, 128, 130, 132, 134, 136.

For example, a distributed database may include local resources of one or more of the local computing devices 106, 108, 110, 112 that is allocated by the virtualization software 114, 116, 118, 120, for example, for the virtual machines 122, 124, 126, 128, 130, 132, 134, 136, for the WAN optimization virtual appliance 100. For example, the distributed database may include virtual resource A 154 (allocated by the virtualization software 114 for the VM A1 122 running on device A 106 for the WAN optimization virtual appliance 100), virtual resource B 156 (allocated by the virtualization software 116 for the VM B1 126 running on device B 108), virtual resource C 158 (allocated by the virtualization software 118 for the VM C1 128 running on device C 110), and virtual resource D 160 (allocated by the virtualization software 120 for the VM D1 132 running on device D 112).

In this context, the virtual machines 122, 124, 126, 128, 130, 132, 134, 136 may communicate with other devices on a network via a virtualization software switch 138, 140, 142, 144 running in the virtualization software 114, 116, 118, 120, for example, such as a hypervisor or virtual machine monitor. For example, the virtualization software switch 138, 140, 142, 144 may handle both traffic between virtual machines and traffic between a VM and external entities.

While virtual resources 154, 156, 158, 160 included in four local computing devices 106, 108, 110, 112 are included in the WAN optimization virtual appliance 100 shown in FIG. 1, any number of virtual resources of any number of devices or local network nodes may be included. The local computing devices 106, 108, 110, 112 may include processing devices such as servers, desktop computers, laptop computers, any type of portable computing devices, or other network devices, and may be capable of sending and receiving messages across network connections such as LAN, WAN, or direct connections, according to example embodiments. The local computing devices 106, 108, 110, 112 each may include one or more processors, and each local computing device 106, 108, 110, 112 may include one or more resources (e.g., storage) that may be available for use by the processors, for example, by sole use of a processor or by shared use.

One or more of the WAN optimization applications 146, 148, 150, 152 (e.g., as part of the distributed WAN optimization application) may use data stored in the distributed database to perform various tasks associated with optimizing or improving WAN traffic, such as, for example: 1) WAN or Internet caching of data to reduce WAN transactions, and 2) data segment caching, also known as data redundancy elimination (DRE). However, according to an example embodiment, WAN optimization may be provided or performed by a virtual appliance, which may make use of resources on multiple local devices, software switches on each device, and a WAN optimization application. These two examples of WAN optimization will now be described in greater detail.

According to an example embodiment, an apparatus may include a first virtual machine provided on a first local device of a plurality of local devices, wherein a portion of resources of the first local device are allocated to the first virtual machine. The apparatus may include a virtualization software switch provided on the first local device configured to forward or redirect at least some traffic from the first local device to a WAN optimization virtual appliance, the WAN optimization virtual appliance including at least the first virtual machine, a second virtual machine on a second local device of the plurality of local devices, and a distributed WAN optimization application running at least on the first and second virtual machines.

According to an example embodiment, one or more of the WAN optimization applications 146, 148, 150, 152 (e.g., as part of the distributed WAN optimization application) may be configured to provide WAN or Internet caching of data retrieved across the WAN 102 by storing the retrieved data in a distributed database (not explicitly shown in FIG. 1) that may include the resources of one or more of the computing devices allocated by the virtualization software 114, 116, 118, 120 to the WAN optimization virtual appliance 100.

According to an example embodiment, resources of the first and second local devices may be allocated to the distributed WAN optimization application provided on the first and second virtual machines by virtualization software, wherein the distributed WAN optimization application may be configured to provide WAN or Internet caching of data retrieved across a WAN by storing the retrieved data in a distributed database that includes resources of one or more of the plurality of local devices allocated by virtualization software to the WAN optimization virtual appliance. According to an example embodiment, the resources may include one or more of a processor, memory or cache, or disk.

According to an example embodiment, one or more of the WAN optimization applications 146, 148, 150, 152 (e.g., as part of the distributed WAN optimization application) may be configured to provide data segment caching by storing one or more data segments and a segment signature for each stored segment, the data segments and associated segment signatures being stored in a distributed database that includes the resources of one or more of the computing devices allocated by the virtualization software to the WAN optimization virtual appliance 100.

According to an example embodiment, resources of the first and second local devices may be allocated to the distributed WAN optimization application provided on the first and second virtual machines by virtualization software, wherein the distributed WAN optimization application may be configured to provide data segment caching by storing one or more data segments and a segment signature for each stored segment, the data segments and associated segment signatures being stored in a distributed database that includes resources of one or more of the plurality of local devices allocated by virtualization software to the WAN optimization virtual appliance.

According to an example embodiment, one or more of the WAN optimization applications 146, 148, 150, 152 (e.g., as part of the distributed WAN optimization application) may be provided on each (or one or more) of the plurality of local computing devices 106, 108, 110, 112, each of the WAN optimization applications being in communication with each other to perform WAN optimization.

According to an example embodiment, the distributed WAN optimization application may include a first WAN optimization application running on the first virtual machine and a second WAN optimization application running on the second virtual machine. According to an example embodiment, the distributed WAN optimization application comprises a WAN optimization application provided on each of the plurality of local devices, each of the WAN optimization applications being in communication with each other to perform WAN optimization.

According to an example embodiment, the distributed WAN optimization application may include a first WAN optimization application running on the first virtual machine and a second WAN optimization application running on the second virtual machine, wherein the virtualization software switch may be configured to forward or redirect at least some traffic to the first WAN optimization application.

According to an example embodiment, the distributed WAN optimization application may include a first WAN optimization application running on the first virtual machine and a second WAN optimization application running on the second virtual machine, each of the WAN optimization applications being in communication with each other to perform WAN optimization, wherein the virtualization software switch may be configured to forward or redirect at least some traffic to the second WAN optimization application.

For example, at the local computing device 106, a request message requesting a video file from the remote device E 104 may be generated by the local computing device 106, and may be sent to the virtualization software switch 138, which may then direct the request to the WAN optimization virtual appliance 100. For example, the virtualization software switch 138 may direct the request to the virtual machine 122. According to an example embodiment, a virtual distributed cache (e.g., included in the WAN optimization virtual appliance 100) may be searched to determine whether the requested video file has already been received from the remote device E 104 by one or more of the local computing devices 106, 108, 110, 112. If the search is successful, then the video file may be retrieved locally at the WAN optimization virtual appliance 100, instead of requesting that the remote device E 104 retrieve the video file and send it to the local computing device 106 via the WAN 102.

As another example, if the remote device E 104 obtains a request to send a data item to the local computing device 106, the remote device E 104 may query a WAN optimization virtual appliance that is local to the remote device E 104 to quickly determine whether the data item has already been sent to the local computing device 106. According to an example embodiment, such a search at the remote device E 104 may potentially alleviate a need to re-send large amounts of data over the WAN 102.

Figure 2:
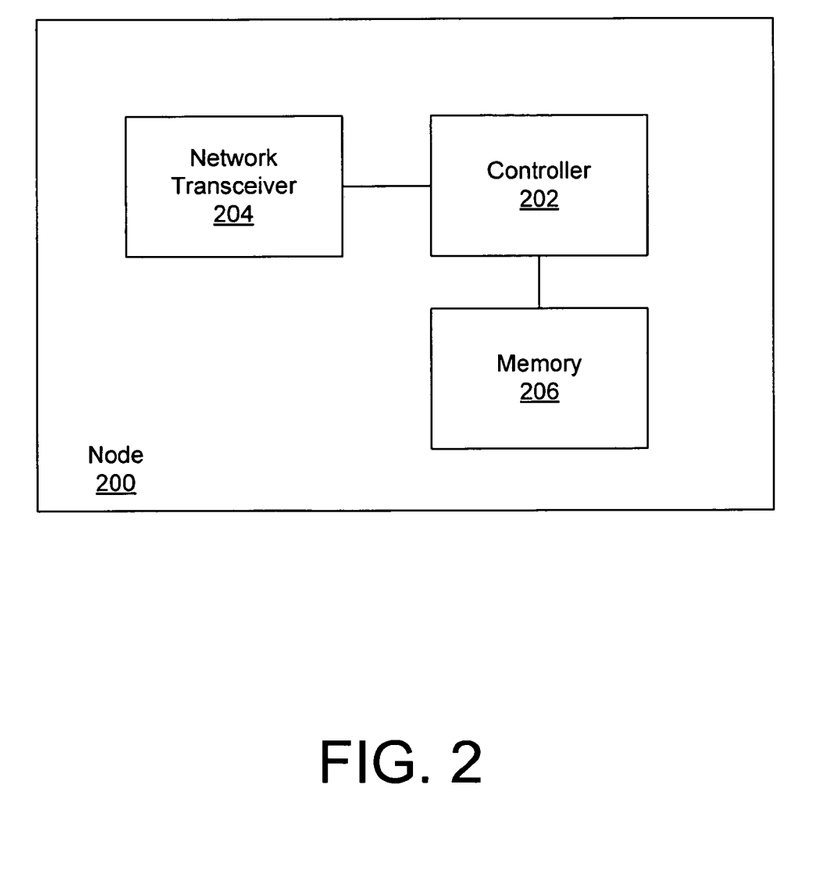
FIG. 2 is a block diagram of a device according to an example embodiment.

FIG. 2 depicts a device 200 according to an example embodiment. The device 200 may include any of the devices 106, 108, 110, 112 and may include a controller 202. According to an example embodiment, the controller 202 may be configured to receive, via a virtualization software switch provided by virtualization software provided on a first device (e.g., the local computing device 106), a message addressed to a second device (e.g., the remote device E 104) located remotely from the first device across a WAN (e.g., the WAN 102). The controller 202 may also be configured to determine a virtual machine, included in a distributed virtual appliance located locally to the first device and including the first device, for processing the message. The controller 202 may also be configured to direct the message from the virtualization software switch to the virtual machine for WAN optimization processing. For example, the controller may direct the message from the virtualization software switch 138 to the virtual machine 126 for WAN optimization processing (e.g., via the WAN optimization virtual appliance 100).

According to an example embodiment, the controller 202 may include one or more processors (e.g., central processing units (CPUs)). According to an example embodiment, the device 200 may include one or more resources (e.g., storage) that may be available for use by the one or more processors, for example, by sole use of a processor or by shared use among multiple processors. According to an example embodiment, the device 200 may include a server that includes one or more CPUs and one or more resources available for use by the one or more CPUs.

The device 200 may also include a network transceiver 204, which may include a transmitter to transmit signals and a receiver to receive signals. For example, network transceiver 204 may receive the request messages from a network and route the request message to the controller 202. The device 200 may include a memory 206, which may store information, according to an example embodiment. For example, a portion of the memory 206 may be included as virtual cache or distributed database associated with the WAN optimization virtual appliance 100 discussed previously.

Figure 3:
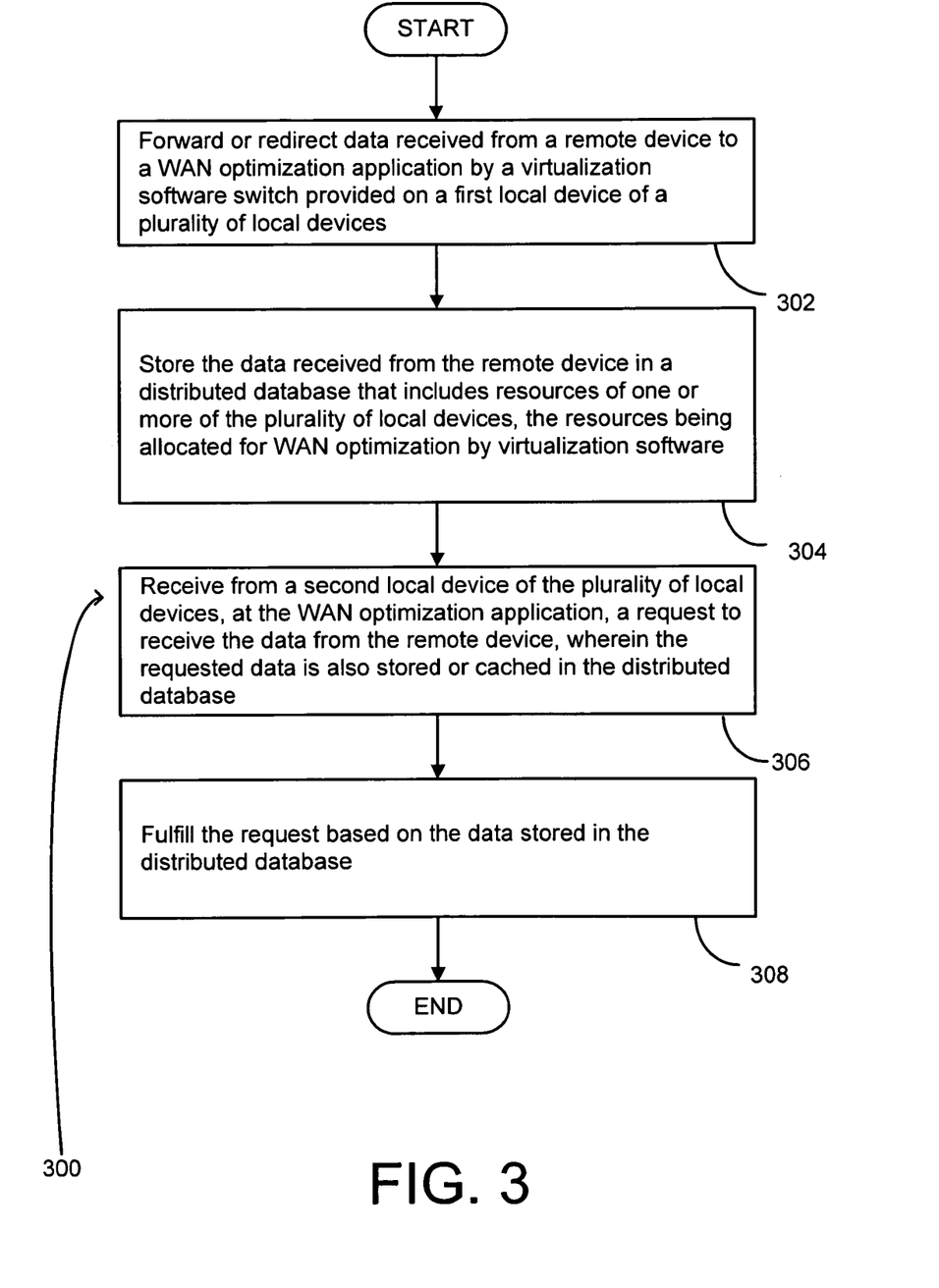
FIG. 3 is a flow chart illustrating operation of a WAN optimization virtual appliance according to an example embodiment.

FIG. 3 shows a method of performing WAN optimization 300 according to an example embodiment. The method 300 may include forwarding or redirecting data received from a remote device to a WAN optimization application by a virtualization software switch provided on a first local device of a plurality of local devices (302). For example, the virtualization software switch 138 may forward or redirect data from the remote device E 104 to the WAN optimization application 146, which may be executing as part of the WAN optimization virtual appliance 100.

According to an example embodiment, the forwarding or redirecting may include redirecting the data to the WAN optimization application 148 running on the local computing device 108 via a fast node-to-node connection. For example, the data may be redirected via a fast device-to-device or node-to-node connection at a connection speed rated in speeds of gigabytes per second or faster.

The method 300 may include storing the data received from the remote device in a distributed database that includes resources of one or more of the plurality of local devices, the resources being allocated for WAN optimization by virtualization software (304). For example, the data may be stored in a distributed database including one or more of the virtual resources 154, 156, 158, 160 discussed previously.

The method may include receiving from a second local device of the plurality of local devices, at the WAN optimization application, a request to receive the data from the remote device, wherein the requested data is also stored or cached in the distributed database (306). For example, a request to receive data from the remote device E 104 may be received at the WAN optimization application 146, from the local device 108. For example, the requested data may also be stored or cached in a distributed database that includes resources (e.g., virtual resources 154, 156, 158, 160) of one or more of the local devices (e.g., the local computing devices 106, 108, 110, 112).

The method 300 may also include fulfilling the request based on the data stored in the distributed database (308). According to an example embodiment, the fulfilling the request (308) may include sending data from a third local device of the plurality of local devices that is storing the requested data to the second local device. For example, data stored on the device 110 may be sent to the local computing device 108, which may have requested the data.

Figure 4:
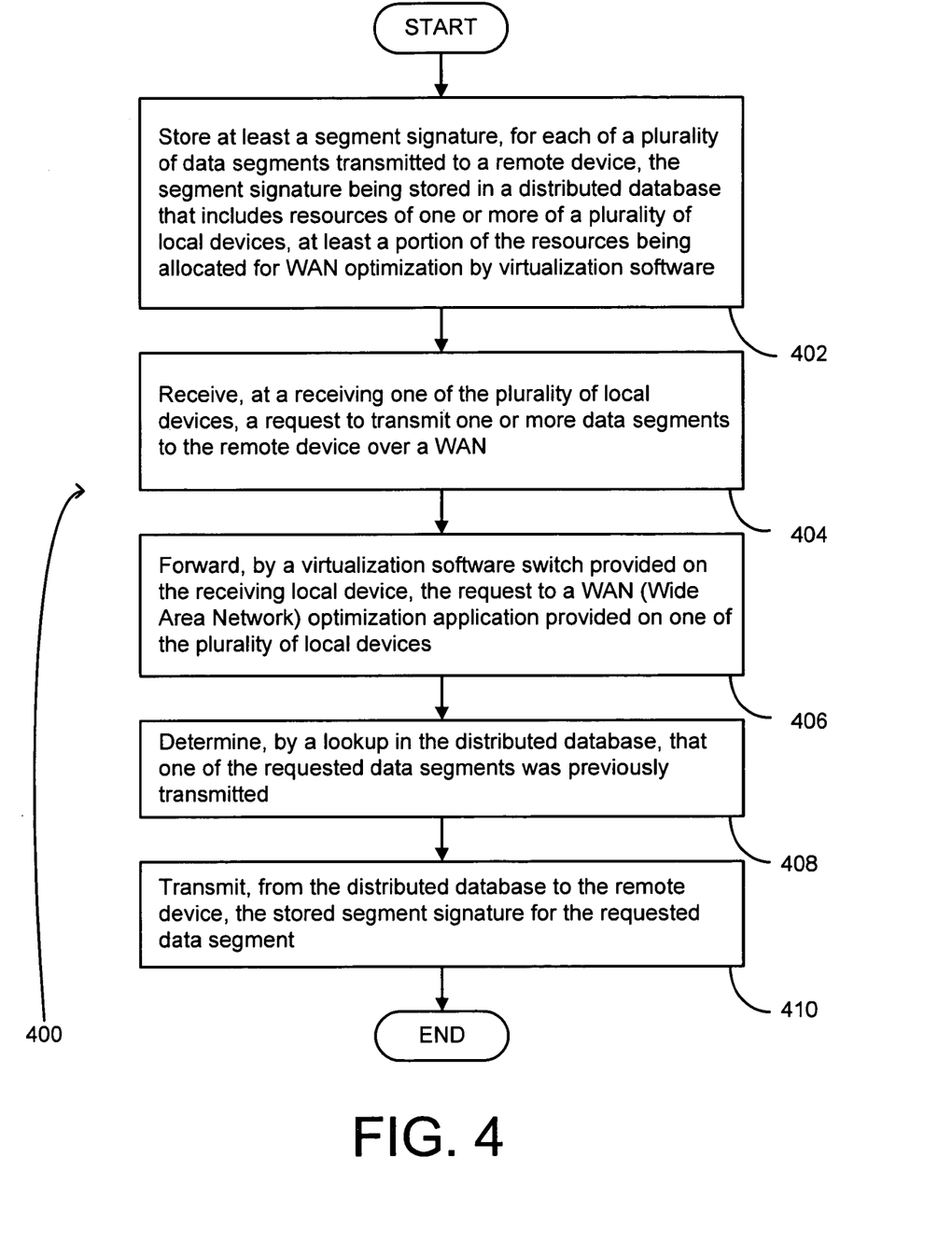
FIG. 4 is a flow chart illustrating operation of a WAN optimization virtual appliance according to another example embodiment.

FIG. 4 shows another method of performing WAN optimization 400 according to another example embodiment. The method 400 may include storing at least a segment signature, for each of a plurality of data segments transmitted to a remote device, the segment signature being stored in a distributed database that includes resources of one or more of a plurality of local devices, at least a portion of the resources being allocated for WAN optimization by virtualization software (402). For example, the segment signature may be stored in a distributed database that may include resources such as the virtual resources 154, 156, 158, 160 discussed previously.

The method 400 may further include receiving, at a receiving one of the plurality of local devices, a request to transmit one or more data segments to the remote device over a WAN (404). For example, the request to transmit may be received at the local computing device 106. The request may include a request to transmit data to the remote device E 104 over the WAN 102.

The method may further include forwarding, by a virtualization software switch provided on the receiving local device, the request to a WAN optimization application provided on one of the plurality of local devices (406). For example, the virtualization software switch 138 may forward the request to the WAN optimization application 146.

The method 400 may also include determining, by a lookup in the distributed database, that one of the requested data segments was previously transmitted (408). For example, each of the WAN optimization applications 146, 148, 150, 152 may be updated via a peer-to-peer protocol as other ones of the WAN optimization applications 146, 148, 150, 152 update their stored information. Thus, it may be determined via a lookup operation whether one of the requested data segments was previously transmitted.

The method 400 may also include transmitting, from the distributed database to the remote device, the stored segment signature for the requested data segment (410). For example, if it is determined that the requested data segment was previously transmitted, then the stored segment signature may be retrieved (e.g., from storage at local device A 106 included in the distributed database), and transmitted to remote device E 104.

Figure 5:
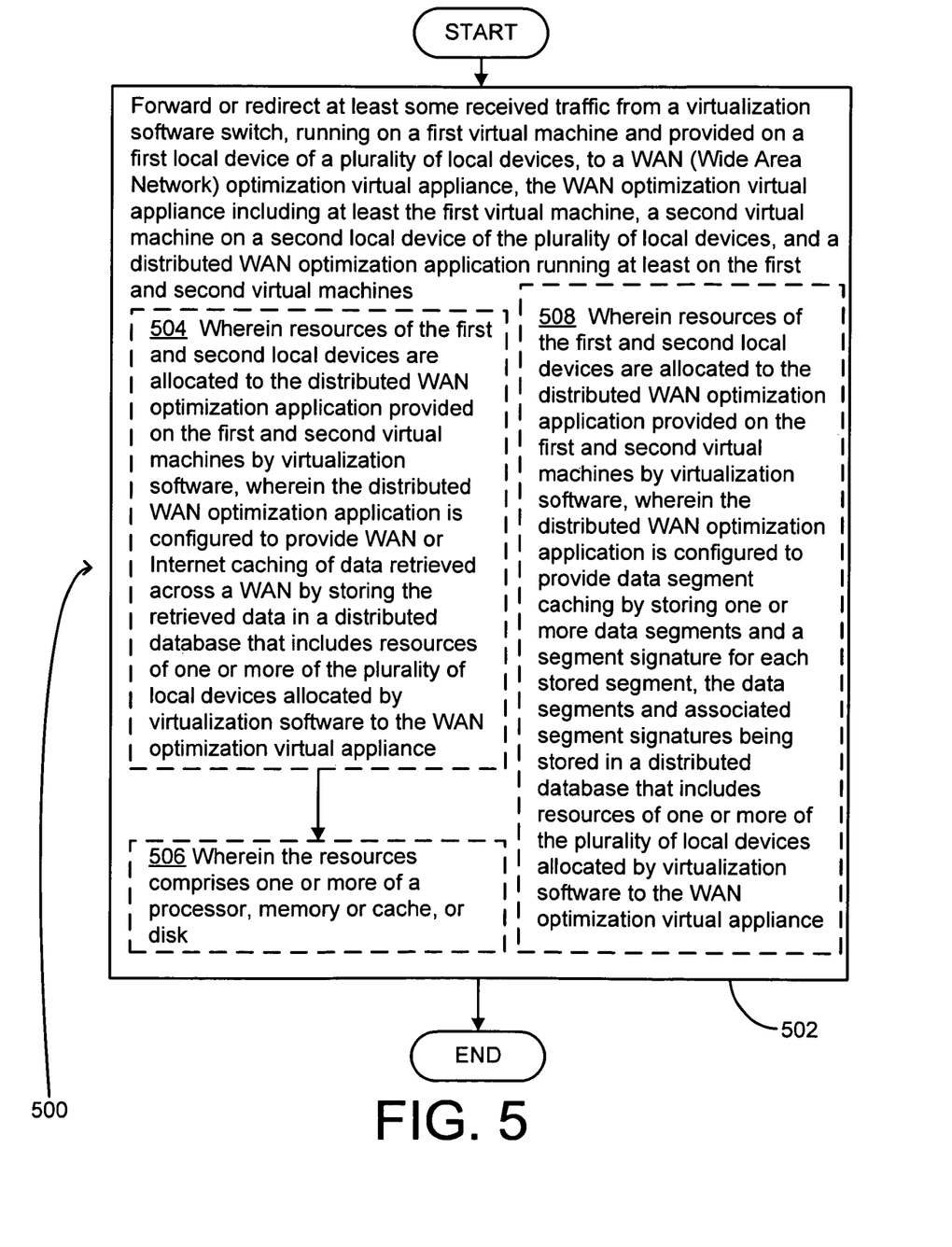
FIG. 5 is a flow chart illustrating operation of a WAN optimization virtual appliance according to another example embodiment.

FIG. 5 shows another method 500 according to another example embodiment. In this example, the method 500 may include forwarding or redirecting at least some received traffic from a virtualization software switch, running on a first virtual machine and provided on a first local device of a plurality of local devices, to a WAN optimization virtual appliance, the WAN optimization virtual appliance including at least the first virtual machine, a second virtual machine on a second local device of the plurality of local devices, and a distributed WAN optimization application running at least on the first and second virtual machines (502).

According to an example embodiment, resources of the first and second local devices may be allocated to the distributed WAN optimization application provided on the first and second virtual machines by virtualization software, wherein the distributed WAN optimization application may be configured to provide WAN or Internet caching of data retrieved across a WAN by storing the retrieved data in a distributed database that includes resources of one or more of the plurality of local devices allocated by virtualization software to the WAN optimization virtual appliance (504). According to an example embodiment, the resources may include one or more of a processor, memory or cache, or disk (506).

According to an example embodiment, resources of the first and second local devices are allocated to the distributed WAN optimization application provided on the first and second virtual machines by virtualization software, wherein the distributed WAN optimization application is configured to provide data segment caching by storing one or more data segments and a segment signature for each stored segment, the data segments and associated segment signatures being stored in a distributed database that includes resources of one or more of the plurality of local devices allocated by virtualization software to the WAN optimization virtual appliance (508) According to an example embodiment, the WAN optimization virtual appliance 100 may include resources allocated to a plurality of virtual machines 122, 124, 126, 128, 130, 132, 134, 136 by virtualization software 114, 116, 118, 120 provided on each of a plurality of devices 106, 108, 110, 112 coupled together and located locally to each other.

According to an example embodiment, the distributed WAN optimization application may include a first WAN optimization application running on the first virtual machine and a second WAN optimization application running on the second virtual machine.

According to an example embodiment, the distributed WAN optimization application may include a WAN optimization application provided on each of the plurality of local devices, each of the WAN optimization applications being in communication with each other to perform WAN optimization.

According to an example embodiment, the distributed WAN optimization application may include a first WAN optimization application running on the first virtual machine and a second WAN optimization application running on the second virtual machine, wherein the virtualization software switch may be configured to forward or redirect at least some traffic to the first WAN optimization application.

According to an example embodiment, the distributed WAN optimization application may include a first WAN optimization application running on the first virtual machine and a second WAN optimization application running on the second virtual machine, each of the WAN optimization applications being in communication with each other to perform WAN optimization, wherein the virtualization software switch may be configured to forward or redirect at least some traffic to the second WAN optimization application.

According to an example embodiment, the virtualization software may include hypervisor software.

The example techniques discussed herein may be implemented, for example, by using virtualization software to achieve optimal utilization or resources, reduced power requirement, and better management. The local computing devices 106, 108, 110, 112 may include desktops or laptops, for example, running virtualization software. According to an example embodiment, the virtualization software may include a software switch that may be configured to provide basic switching functionality to switch between virtual machines and to external hosts. According to an example embodiment, such a software switch included with the virtualization software may redirect traffic to a WAN optimization virtual appliance 100, for example, the via the local computing device 106, running on either the same desktop/laptop, or some other desktop/laptop, for example, device 108, 110, or 112.

According to an example embodiment, a number of WAN optimization virtual appliances may collaborate in optimizing WAN traffic. According to an example embodiment, an aggregation of a number of distributed virtual machines may be referred to as one "virtual branch office appliance," which may thus minimize or obviate a need for a physical appliance in a branch office. Such an appliance may more efficiently scale with the number of users, and with the power of the involved devices.

According to an example embodiment, a portion of the resources of a device (e.g., CPU/memory/disk) may be dedicated to a virtual distributed caching application instead of using a physical device. Thus, it may be possible to determine whether any other device associated with a branch office may already have requested content (and stored the content in cache memory) so that the content may be locally served, from within the branch office, thus avoiding a WAN transaction.

According to an example embodiment, redundancy elimination may be achieved via the example techniques discussed herein. Further, Transmission Control Protocol (TCP) optimization may be achieved, based on aggregating TCP connections for the branch office among a number of virtual machines running on devices located at the branch office, according to an example embodiment. Such virtual machines may, for example, run TCP stacks that may be configured to handle WAN transactions.

According to an example embodiment, data redundancy elimination (DRE) may refer to a bidirectional database of blocks of data seen within TCP byte streams. For example, DRE may inspect incoming TCP traffic and identify data patterns. As patterns are identified and added to the DRE database, they may then be used in the future as a compression history, and repeated patterns may be replaced with very small signatures that may inform a distant device on how to rebuild the original message. With DRE, bandwidth consumption may be minimized, and latency associated with transferring data may also be minimized, as fewer packets need to be exchanged. According to an example embodiment, DRE may maintain application and protocol coherency and correctness because the original message rebuilt by the distant device may be verified for accuracy at multiple levels and may be application independent. According to an example embodiment, patterns learned from one application flow may be used when another flow is observed, even if a different application is used. According to an example embodiment, DRE may provide from 2:1 to 100:1 compression based on application, data, and workload. According to an example embodiment, chunk databases may need to be kept in synchronization between the sender and receiver across the WAN.

Example solutions may involve using a disk as storage at the headquarters office, or headend or datacenter. According to an example embodiment, a number of headend appliances may be deployed to handle throughput requirements. According to this example, traffic to and from the headend may be forwarded to these appliances for WAN optimization. However, using the example techniques discussed herein, a "datacenter virtual appliance," similar to the "branch office virtual appliance" discussed previously, may replace the example physical headquarters or headend appliances discussed above.

Thus, the "datacenter virtual appliance" may alleviate scalability issues in WAN throughput, and the "branch office virtual appliance" may alleviate a need for a physical branch office appliance.

According to an example embodiment, a "datacenter virtual appliance" may include the WAN optimization virtual appliance 100 that may include virtual resources, for example, from a number of servers in a datacenter included in the remote device E 104. For example, in order to alleviate an issue of building a large fast cache for the chunk database for redundancy elimination, a large fast cache may include a virtual distributed database built from portions of dedicated memory in servers located at the remote device E 104 (e.g., configured similarly to the WAN optimization virtual appliance 100), for example, with 512 megabytes (MB)/server*100 servers=50 GB.

According to an example embodiment, such headend servers running applications that may be accessed across a WAN may run on virtualization software as discussed previously. According to an example embodiment, traffic to/from these applications may be redirected by the software switch (discussed previously) to an example redundancy elimination virtual machine either running on the same server or another server. In the example redundancy elimination virtual machine, the traffic stream may be broken into data stream chunks. Each chunk may then be looked up in the distributed database to determine whether it is a redundant chunk, i.e., whether it was transmitted earlier to the destination and is cached in the destination. If it is a redundant chunk, the chunk stream may be replaced, for example, with a chunk signature in order to optimize WAN traffic.

According to an example embodiment, a packet/TCP flow/message may be split up into segments. The segments may be cached along with their signatures (e.g., as with a Message-Digest Algorithm 5 (MD5) hash at both the sender and receiver. If the sender finds a repetition of a segment then the sender may send the MD5 hash (e.g., which may be further mapped to an index to save bandwidth) to the receiver instead of the actual segment. This example may succeed even if the segments repeat in different byte alignments in the packets/TCP flow/message, as the packet/TCP flow/message is broken into segments based on the content rather than byte positions.

According to an example embodiment, a packet/TCP flow/message may be broken into unique segments. For example, if a first web page and a second web page both include a common gif file, and if the second web page is accessed after the first web page, then the gif file appearing on the network may be broken into the same set of segments for both the first access and the second access, enabling redundancy elimination.

According to an example embodiment, the segment itself may be maintained because just signature comparison may not be enough due to collisions in the signature. Thus, after a signature match the segment in the traffic stream may be byte compared to the segment stored in the database to ensure there is no collision. The chances of collision may be reduced by choice of signature algorithm (which may involve higher performance cost).

According to an example embodiment, a message may include an application level message (e.g., a SOAP message); however, the example techniques discussed herein are not restricted to applying redundancy elimination at packet or flow or message level.

According to an example embodiment, a transmitting device may include a cache of signature to segment mappings (e.g., via a hash table). For example, the mappings may be stored in the distributed database as discussed previously, instead of storing server specific signature/segment mappings. According to an example embodiment, the distributed database may be constructed based on using memory available in all the participating local computing devices 106, 108, 110, 112, and based on using peer to peer (P2P) protocols for data exchange. In this context, a P2P computer network may use diverse connectivity between participants in a network and the cumulative bandwidth of network participants rather than conventional centralized resources wherein a relatively low number of servers provide the core value to a service or application. According to an example embodiment, P2P protocols may be used for connecting nodes via largely ad hoc connections.

One skilled in the art of data processing may appreciate that the distributed database design itself may be provided in many different configurations, and may provide better performance than a disk based system (e.g., which may store the signature/segment mapping in a disk). According to an example embodiment, since the access to the mappings may be random (e.g., receiving traffic from multiple virtual machines and applications) and may utilize very little (or no) locality of reference, the data rates may be limited by disk speeds for random accesses (e.g., on the order of 1 MBps). Therefore, example efficient disk caching schemes as discussed herein may advantageously increase the data rates.

According to an example embodiment, a distributed database (e.g., a distributed hash) may include the following:

1) the signatures and a reference to the owner of a chunk may be broadcast to all the participating local computing devices. Each participating local computing device may maintain a hash table that either maps to the segment or a reference to the owner of the segment.

2) when a packet/TCP flow/message is broken up and its signature calculated, it is looked up its participating local computing device's hash table. If the segment is remote, a Remote Procedure Call (RPC) may be performed with segment contents which may be byte compared at an owner participating local computing device (e.g., a server). The RPC call may return an indication of whether a collision is detected.

3) if a collision is detected, it may be determined whether to keep the existing entry or to replace it with a new entry. If the entry is replaced, the remote participating local computing device receiving the broadcast may need to store a replacement and may no longer be the owner.

According to an example embodiment, not all segments may be stored in the database; for example, a filter may be applied. For example, a certain segment may need to receive a predetermined number of hits within a predetermined time period. According to an example embodiment, the example techniques discussed herein may allow segments to be stored in participating local computing devices that frequently access the segment. For example, either the ownership may be moved or a copy of the segment may be stored in the appropriate devices.

According to an example embodiment, distributed hash tables may be used. According to an example embodiment, the example DRE techniques discussed above may be implemented with or without disk resources. According to an example embodiment, the example DRE techniques may be implemented without disk since the total cache size is still high because memory may be allocated from every participating server. According to an example embodiment, memory in the servers may be utilized as a large cache and disk may be utilized underneath.

According to an example embodiment, the techniques discussed herein may be used for a number of other applications such as application specific optimizations configured to minimize chatter across a WAN (e.g., in Wide Area file system services), and in TCP optimization.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A system comprising:
a plurality of local devices each including a memory and a processor;
a distributed WAN (Wide Area Network) optimization virtual appliance, wherein the distributed WAN optimization virtual appliance comprises a plurality of virtual machines provided by virtualization software running on the plurality of local devices including at least a first virtual machine running on a first local device of the plurality of local devices and a second virtual machine running on a second local device of the plurality of local devices, a portion of resources of the first local device are allocated to the first virtual machine;
a distributed WAN optimization application running at least on the first and second virtual machines;
a virtualization software switch provided on each of the plurality of local devices, wherein the virtual machines of the distributed WAN optimization virtual appliance communicate with other devices on a network via the virtualization software switch running in the virtualization software, the virtualization software switch associated with the first virtual machine and running on the first local device being configured to forward or redirect a WAN data transmission request associated with the first local device and a remote device external to the distributed WAN optimization virtual appliance that communicates with the first local device via a WAN to the distributed WAN optimization application running on the first virtual machine; and
a distributed database comprising resources of two or more of the plurality of local devices that are allocated by the virtualization software to the distributed WAN optimization virtual appliance;
wherein the distributed WAN optimization application running on the first virtual machine is configured to:
perform WAN or Internet caching of data received from the remote device across the WAN in the distributed database, and data segment caching by storing one or more data segments transmitted to the remote device from one of the plurality of local devices and a segment signature for each stored segment in the distributed database;
receive, via the virtualization software switch running on the first local device, the data transmission request, wherein the data transmission request is one of a request to receive data from the remote device, and a request to transmit data to the remote device;
responsive to the received data transmission request requesting to receive data from the remote device, search the distributed database to determine whether the data requested to be received has already been received from the remote device by one or more of the plurality of local devices associated with the distributed database and, when it is determined that the data requested to be received has already been received from the remote device by one or more of the plurality of local devices associated with the distributed database, fulfill the data transmission request using data stored in the distributed database by sending to the first local device the data requested to be received from a local device of the plurality of local devices that is storing the data requested to be received; and responsive to the received data transmission request requesting to transmit data to the remote device, determine, by a lookup in the distributed database, that one or more data segments of the data requested to be transmitted was previously transmitted to the remote device by one or more of the plurality of local devices associated with the distributed database and fulfill the data transmission request by retrieving and transmitting stored segment signatures for the one or more determined data segments from the distributed data to the remote device.

2. The system of claim 1, wherein resources of the first and second local devices are allocated to the distributed WAN optimization application running on the first and second virtual machines by the virtualization software, wherein performing WAN or Internet caching of data comprises storing data retrieved across the WAN in the distributed database.

3. The system of claim 2, wherein the resources of the first and second local devices comprises one or more of a processor, memory or cache, or disk.

4. The system of claim 1, wherein resources of the first and second local devices are allocated to the distributed WAN optimization application running on the first and second virtual machines by the virtualization software, wherein performing data segment caching of data segment data comprises storing one or more data segments and respective segment signatures for each stored data segment, the data segments and the respective segment signatures being stored in the distributed database.

5. The system of claim 1, wherein the distributed WAN optimization application comprises a first WAN optimization application running on the first virtual machine and a second WAN optimization application running on the second virtual machine.

6. The system of claim 1, wherein the distributed WAN optimization application comprises a WAN optimization application provided on each of the plurality of local devices, each of the WAN optimization applications being in communication with each other to perform WAN optimization.

7. The system of claim 1, wherein the distributed WAN optimization virtual appliance is configured such that a file stored in the distributed database at any of the plurality of local devices may be retrieved and sent to another of the plurality of local devices.

8. The system of claim 1, wherein processing the forwarded or redirected WAN data transmission request using the cached WAN or Internet cached data comprises one of:
   storing data received over the WAN in the distributed database;
   obtaining data from the distributed database, wherein the obtained data comprises data that was previously received over the WAN and stored in the distributed database.

9. The system of claim 1, wherein when the WAN data transmission request associated with the first local device and the remote device comprises a request by the first local device to receive data from the remote device, processing by the distributed WAN optimization application of the forwarded or redirected WAN data transmission request comprises providing data associated with any determined portion of the WAN data transmission request to the first local device from the distributed database.

10. The system of claim 1, wherein when the WAN data transmission request associated with the first local device and the remote device comprises a request by the remote device to the first local device to receive one or more data segments from the first local device, performing data segment caching by the distributed WAN optimization application of data segment data comprises storing one or more data segments and respective segment signatures for each stored data segment and the one or more data segments and the respective segment signatures are stored in the distributed database, and the processing by the distributed WAN optimization application running on the first virtual machine of the forwarded or redirected WAN data transmission request comprises providing at least one stored segment signature representing at least one data segment associated with any determined portion of the WAN data transmission request to the remote device from the distributed database.

11. A method comprising:
   in a distributed Wide Area Network (WAN) optimization virtual appliance, wherein the distributed WAN optimization virtual appliance comprises a plurality of virtual machines provided by virtualization software running on a plurality of local devices including at least a first virtual machine running on a first local device, a portion of resources of the first local device allocated to the first virtual machine, and a second virtual machine running on a second local device, forwarding or redirecting, by a virtualization software switch associated with the first virtual machine and running on the first local device, a WAN data transmission request associated with the first local device and a remote device external to the distributed WAN optimization virtual appliance that communicates with the first local device via a WAN to a distributed WAN optimization application running on the first virtual machine, wherein the distributed WAN optimization application runs on at least the first and second virtual machines, wherein a virtualization software switch is provided on each of the plurality of local devices and wherein the plurality of virtual machines of the distributed WAN optimization virtual appliance communicate with other devices on a network via the virtualization software switches running in the virtualization software;
   performing, by the distributed WAN optimization application running on the first virtual machine, WAN or Internet caching of data received from the remote device across the WAN in a distributed database that comprises resources of two or more of the plurality of local devices that are allocated by the virtualization software to the distributed WAN optimization virtual appliance, and data segment caching by storing one or more data segments transmitted to the remote device from one of the plurality of local devices and a segment signature for each stored segment in the distributed database;
   receiving, by the distributed WAN optimization application running on the first virtual machine via the virtualization software switch running on the first local device, the data transmission request, wherein the data transmission request is one of a request to receive data from the remote device, and a request to transmit data to the remote device;
   wherein, responsive to the received data transmission request requesting to receive data from the remote device, the distributed WAN optimization application running on the first virtual machine searching the distributed database to determine whether the data requested to be received has already been received from the remote device by one or more of the plurality of local devices associated with the distributed database and, when it is determined that the data requested to be received has already been received from the remote device by one or more of the plurality of local devices associated with the distributed database, fulfilling the data transmission request using data stored in the distributed database by sending to the first local device the data requested to be received from a local device of the plurality of local devices that is storing the data requested to be received; and wherein, responsive to the received data transmission request requesting to transmit data to the remote device, the distributed WAN optimization application running on the first virtual machine determining, by a lookup in the distributed database, that one or more data segments of the data requested to be transmitted was previously transmitted to the remote device by one or more of the plurality of local devices associated with the distributed database and fulfilling the data transmission request by retrieving and transmitting stored segment signatures for the one or more determined data segments from the distributed data to the remote device.

12. The method of claim 11, wherein resources of the first and second local devices are allocated to the distributed WAN optimization application running on the first and second virtual machines by the virtualization software, wherein the distributed WAN optimization application is configured to perform WAN or Internet caching of data by storing data retrieved across the WAN in the distributed database, the resources of the distributed database being allocated by the virtualization software to the WAN optimization virtual appliance.

13. The method of claim 12, wherein the resources of the first and second local devices comprises one or more of a processor, memory or cache, or disk.

14. The method of claim 11, wherein the distributed WAN optimization application comprises a WAN optimization application provided on each of the plurality of local devices, each of the WAN optimization applications being in communication with each other to perform WAN optimization.

15. The method of claim 11, wherein the distributed WAN optimization application comprises a first WAN optimization application running on the first virtual machine and a second WAN optimization application running on the second virtual machine, wherein the virtualization software switch on the first local device is configured to forward or redirect the WAN data transmission request to the first WAN optimization application.

16. The method of claim 11, wherein the distributed WAN optimization application comprises a first WAN optimization application running on the first virtual machine and a second WAN optimization application running on the second virtual machine, each of the first and second WAN optimization applications being in communication with each other to perform WAN optimization, wherein the virtualization software switch on the second local device is configured to forward or redirect the WAN data transmission request to the second WAN optimization application.

17. The method of claim 11, wherein processing the forwarded or redirected WAN data transmission request using the WAN or Internet cached data comprises one of:
storing data received over the WAN in the distributed database;
obtaining data from the distributed database, wherein the obtained data comprises data that was previously received over the WAN and stored in the distributed database.

18. The method of claim 11, wherein when the WAN data transmission request associated with the first local device and the remote device comprises a request by the first local device to receive data from the remote device, processing the forwarded or redirected WAN data transmission request comprises providing data associated with any determined portion of the WAN data transmission request to the first local device from the distributed database.

19. The method of claim 11, wherein when the WAN data transmission request associated with the first local device and the remote device comprises a request by the remote device to the first local device to receive one or more data segments from the first local device, performing data segment caching of data segment data comprises storing one or more data segments and respective segment signatures for each stored data segment and the one or more data segments and the respective segment signatures are stored in the distributed database, and processing of the forwarded or redirected WAN data transmission request comprises providing at least one stored segment signature representing at least one data segment associated with any determined portion of the WAN data transmission request to the remote device from the distributed database.

* * * * *